Jan. 23, 1951 W. E. MERRILL 2,538,790
ELECTRIC BEARING TESTER
Filed June 18, 1946
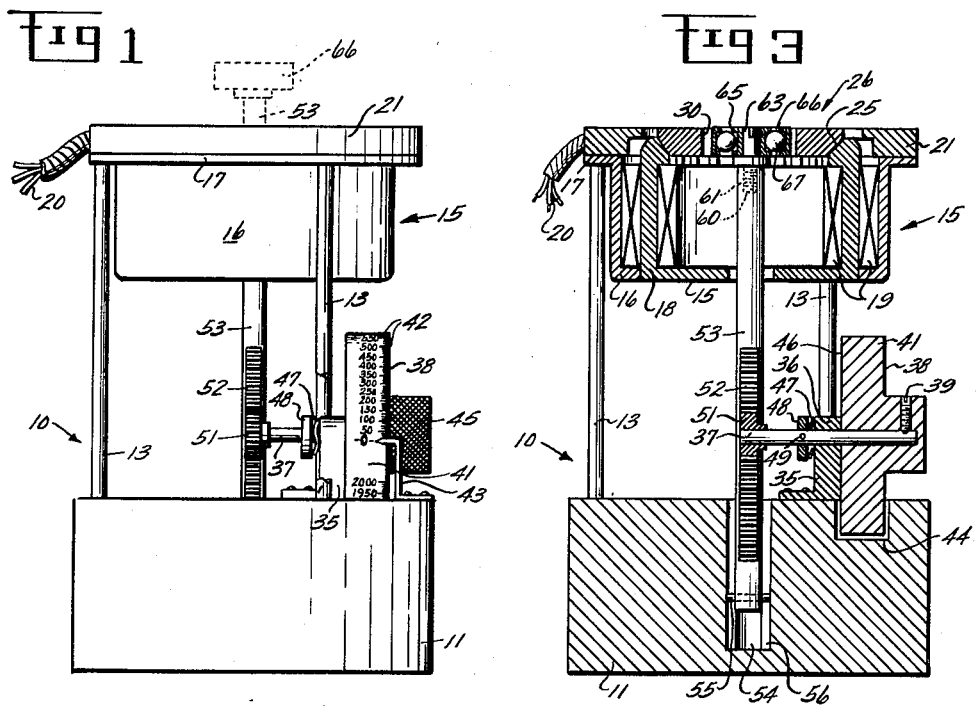
INVENTOR.
WILLIAM E. MERRILL Patented Jan. 23, 1951

2,538,790

UNITED STATES PATENT OFFICE 2,538,790

ELECTRIC BEARING TESTER

William E. Merrill, Dayton, Ohio

Application June 18, 1946, Serial No. 677,469

6 Claims. (Cl. 73—9)

(Granted under the act of March 3, 1883, as amended April 30, 1928; 370 O. G. 757)

The invention described herein may be manufactured and used by or for the Government for governmental purposes without payment to me of any royalty thereon.

This invention relates to electric bearing testers for bearings of the type having inner and outer race members and rolling elements therebetween which produces relative rotation of the bearing parts by magnetic induction to detect imperfections and dirt, and to detect excess frictional drag produced by close mechanical tolerance of the bearing parts.

The practice of testing bearings of the "frictionless" type varies widely. Such practice ranges from holding the inner bearing race member in the hand and spinning the outer bearing race member by hand or by a jet of air against the roller elements to inserting the bearing in a massive testing machine enclosing the bearing in a mass such as a wheel subjecting it to stresses and strains for formulating some deduction of the bearing performance. Those deductions are subject too often to guesswork, the reliance on which may destroy the efficiency of or endanger otherwise reliable machinery.

The present invention is provided to eliminate much of the guesswork and human error in the usual practice of testing the "frictionless" type bearings by producing an inexpensive small and light weight electric bearing tester in which a bearing can be quickly and easily tested, without the use of any mass attached to the bearing, by magnetic induction to check bearing performance according to definite specifications.

It is a primary object of my invention to provide an electric bearing tester for bearings having inner and outer race members with rolling elements therebetween in which rotary motion of the outer race member relative to the inner race member is attained by varying the bearing position in a rotating magnetic field to produce the rotary motion by magnetic induction.

It is another object of my invention to provide an electric bearing tester including adapters for testing various sizes of bearings having inner and outer race members with rolling elements therebetween, the inner bearing race member adapted to be fitted on an adapter of an adjustable bearing shaft arranged centrally with respect to an opening in a polepiece adapter of a stator for producing a rotating magnetic field in which the relative position of the bearing with the magnetic field of the polepiece adapter may be varied to change the relative rotary motion of the bearing parts.

It is a further object of my invention to provide a stand supporting a stator for producing a rotating magnetic field having a polepiece adapter means with a circular opening therein mountable thereon, a nonrotatable bearing shaft adjustable axially along the axis of the stator having a bearing receiving adapter means attached on one end reciprocable through the polepiece adapter opening, and indicating means associated with the stand and the bearing shaft to register the relative position of the bearing receiving adapter means with respect to the opening in the polepiece adapter means upon axial adjustment of the bearing shaft.

Other objects and advantages of my invention will be apparent from a reading of the following description taken in conjunction with the appended drawing, wherein for the purpose of illustration I have shown preferred embodiments of my invention, in which;

Fig. 1 is an elevational view of the electric bearing tester with one supporting rod broken away to reveal the adjusting mechanism structural details;

Fig. 2 is a top plan view of the electric bearing tester;

Fig. 3 is a cross sectional view taken on the line 3—3 of Fig. 2;

Fig. 4 shows an inner race bearing shaft adapter and a bearing;

Fig. 5 shows a polepiece adapter; and

Fig. 6 shows a cutaway view of a modified adjusting and indicating means of the tester.

Referring to Figs. 1 to 5, inclusive, there is shown a stand, generally indicated by the reference character 10, consisting of a substantially cylindrical base member 11, which may be of any desirable material preferably light in weight, that has a flat portion 12. Three rods 13 on the base member 11 support a stator, for producing a rotating magnetic field, generally referred to by the reference character 15, which follows the general stator construction consisting of a frame member 16 having a flange 17 attached to the rods 13 and supporting six pairs of poles 18 and field coil windings 19, the poles 18 being of a ferro-magnetic material and connected at their lower ends to close a magnetic circuit and to allow the field windings 19 to encircle them in the usual manner. The field windings 19 are connectible to an external circuit through the leads 20 which enter through a cap member 21 of nonmagnetic material that is fastened to the flange 17 in any desirable manner. The flange 17 and cap member 21 have a flattened portion 22 directly over and in alignment with the flat portion 12 of the base member 11.

The outer ends of the poles 18 are beveled at 25 for receiving a polepiece adapter 26 with six pairs of poles 27 having cooperative beveled portions 28. The poles 27 of the polepiece 26 are retained in converging relation by a nonmagnetic material 29. The polepiece adapter 26 has a central bore 30 therethrough wh'ch may vary in size for different polepiece adapters to accommodate different sizes of bearings. Two of the poles 27, 180 degrees apart, have a small hole 31 at the outer end to receive a small screw 32 to be received in screw threaded engagement with a tapped opening in two of the corresponding poles 18 for positively retaining the polepiece adapter in position atop the stator 15.

Fixed on the base member 11, as by rivets or studs, is a bracket member 35 having a bore 36 therethrough for journaling an adjusting shaft 37. The outer end of the adjusting shaft 37 has an adjusting wheel 38 fastened thereto by a set screw 39. The adjusting wheel 38 has an enlarged cylindrical portion 41 with indicia 42 therearound. The indexed scale 42 cooperates with a pointer 43 fixed to the base member 11 as by rivets to form a bearing height indicator. The base member 11 has a crescent shaped slot 44 in the top surface thereof for accommodating the enlarged cylindrical portion 41 of the adjusting wheel. The adjusting wheel 38 also has a small cylindrical knurled portion 45 for manually turning the adjusting wheel and adjusting shaft. The inner end face 46 of the adjusting wheel 38 is retained in frictional engagement with the bracket 35 by a marcel spring washer 47 inserted between the bracket 35 and a collar 48 fixed to the adjusting shaft as by a pin 49, or any other well known means.

On the inner end of the adjusting shaft 37 is affixed a pinion gear 51 that cooperates with a gear rack 52 on a bearing shaft 53 for moving the bearing shaft along the stator axis such that the upper end of the bearing shaft is movable from the plane of the stator poles upward. The lower end of the bearing shaft 53 operates in an opening 54 in the base member 11 and has a pin 55 therethrough, the ends of which slide in channels 56 of the opening 54 to permit reciprocable axial and nonrotative movement of the bearing shaft. The upper end of the bearing shaft 53 has a threaded bore 60 to receive the threaded shank 61 of an inner race bearing adapter 62. The inner race bearing adapter 62 (Fig. 4) is provided with a cylindrical portion 63, which may be made in different diameters in respective adapters to receive different sized bearings, and a shoulder 64. The inner race member 65 snugly fits over the cylindrical portion 63 and against the shoulder to prevent any relative rotation between these parts allowing the outer bearing race 66 and the intermediate roller elements 67 to rotate freely relative to the inner race member 65 in the ordinary manner. The indicia 42 is scaled to register the lift of the bearing shaft 53 in thousandths of an inch with 0 placing the bearing adapter 62 in the plane of the poles.

In operation, the proper inner race bearing adapter 62 and polepiece adapter 26 for the bearing to be tested are selected and placed on the tester. The bearing to be tested is slipped on the inner race bearing adapter 62 and current supplied to the stator. It is advisable, in testing self contained bearings, to turn the adjusting wheel 38 until the indicator 42, 43 reads 2000, in which case the tested bearing is two inches out of the full magnetic field, and slowly turning the adjusting wheel until the outer race member 65 begins to rotate slowly, at which time the bearing will be in some position above the polepiece adapter as shown by broken lines in Fig. 1. If the bearing spins slowly and steadily for an indicator setting, meeting the requirements of a specification table prepared for this tester of the particular bearing being tested, the bearing will be approved for this test. Other speeds may be attained by lowering the tested bearing in the magnetic field and those speeds may be checked according to certain specifications by putting a mark on the outer race member 66 and calculating the speed with a stroboscopic tachometer.

In the testing of self-aligning bearings the reverse testing procedure from that above described should be adopted. In conducting this type of test the bearing should be first lowered into the full magnetic field where the indicator reads 0 to produce high speed rotation of the outer bearing race member and then raised until the bearing comes to a slow steady rotative speed at which time the distance of the bearing above the full magnetic field can be compared on the indicator with the approved specifications. This method of testing self-aligning bearings conditions the tested bearing outer race member for good alignment by high speed spin. In the event any tested bearing starts and stops, or turns in a hesitating manner it should be set aside for further cleaning and inspection.

Fig. 6 shows a modification of the adjusting and indicating means in which a bearing shaft 71, similar to the bearing shaft 53, is threaded at 72 to cooperate with a knurled nut 73 resting between the top surface of the base member 11 and a bracket 74 to permit rotary and nonaxial movement of the knurled nut. An upstanding card 75 is attached to the bracket 74 and has indices thereon scaled to represent the lift of the bearing shaft 71 in thousandths of an inch. A pointer 77 attached to the bearing shaft 71 is movable over the indices 76 to indicate the distance of the tested bearing relative to the magnetic field as in the above described embodiment.

Bearings may be tested without the use of a polepiece adapter, where such bearings are of a size to have close relation with the poles of the stator, according to definite performance specifications. Where it is desirable to test a bearing in a vertical position it is only necessary to lay the tester on its flattened portions 12 and 22 as seen in Fig. 2. The polepiece adapter 26 should be fastened to the poles 18 for the vertical test but such attachment is unnecessary for using the tester in the upright position.

The current supplied to the stator 15 must be known to formulate proper specifications. While I have found 115 volts, 3 phase, 400 cycle current to be very satisfactory other current may be used where desirable or as the supply and the equipment dictates. By using 400 cycle current with six pairs of poles desirable high bearing speeds can be obtained for ordinary bearing tests, although the number of poles may be varied at the will of the designer for obtaining different speed performance. A reversing switch may also be employed in the connecting circuit to reverse the tested bearing rotation to provide a more complete check of bearing performance. I have found it desirable in making accurate tests to use a control box having meters to register the cycles, voltage and ampere current flow in the supply circuit to calculate the proper bearing performance although such equipment may be dispensed with if the current voltage and frequency is known in value and known to be constant.

While I have illustrated and described preferred embodiments of this invention which I have found in practice to answer to an admirable degree the ends to be obtained I desire to be understood that the invention is not limited to any specific form or arrangement of parts except in so far as such limitations are specified in the claims.

I claim:

1. An electric bearing tester for bearings having inner and outer race members with roller elements therebetween comprising in combination; a stator, adapted to provide a rotating magnetic field, supported by a stand; a bearing shaft nonrotatively and axially movably supported on said stand to move along the axis of said stator and having a bearing receiving end on which a bearing to be tested is positionable to be carried axially of said stator to subject the outer race member of the bearing to be tested to the flux produced by said stator producing a rotatable torque on said outer race member, the field density of the flux through the outer race member being determined by the relative position of said shaft axially positioning the bearing with respect to said stator; and a manually adjustable rotatable means supported on said stand, said adjustable rotatable means and said shaft having cooperative means thereon for transforming rotary motion of said rotatable means into reciprocal motion of said shaft to axially move said shaft for adjustably positioning said bearing end of said shaft carrying the bearing to be tested along the axis of said stator whereby the flux relation of the outer race member of the tested bearing is adjustably controlled to control the bearing speed.

2. An electric bearing tester for bearings having inner and outer race members with rolling elements therebetween comprising in combination; a stator for producing a rotating magnetic field supported by a stand, polepieces in the said stator having mounted thereon a detachable polepiece adapter means with a circular opening therein, a nonrotatable axially adjustable bearing shaft having a bearing receiving adapter means detachably mounted on one end and reciprocable through the said polepiece adapter means opening on which bearing receiving adapter means the inner race member of a roller bearing is mountable of which the outer race member operates as a rotor in the rotating magnetic field of said stator, and manually actuatable means rotatably mounted on said stand, said manually actuatable means and said shaft having cooperative related power transmitting portions constructed and arranged to transform rotary motion of said manually actuatable means into reciprocal motion of said shaft for varying the relation of the bearing receiving adapter means with the said polepiece adapter means opening for varying the flux relation of the outer race member of a bearing being tested with respect to said stator.

3. An electric bearing tester for bearings having inner and outer race members with rolling elements therebetween comprising in combination; a stator for producing a rotating magnetic field supported by a stand, a bearing shaft nonrotatably and axially adjustable along the axis of the said stator and having a bearing receiving end reciprocable through said stator on which bearing receiving end the inner race member of a roller bearing to be tested is mountable of which the outer race member operates as a rotor in the rotating magnetic field of the stator, a manually rotatable knurled knob rotatably supported on said stand, said knurled knob and said shaft having mechanically coupled portions constructed and arranged to transfer rotary motion of said knurled knob into reciprocable motion of said shaft for varying the flux relation of the outer race member of the bearing being tested with respect to said stator, and indicating means in the coupling between said knurled knob and shaft and the stand for indicating the relative position of the bearing being tested on the bearing receiving end of said shaft with respect to said stator.

4. An electric bearing tester for bearings having inner and outer race members with rolling elements therebetween comprising in combination; a stator for producing a rotating magnetic field, having polepieces to receive polepiece adapter means with a circular opening therein, supported on a stand; a nonrotatable axially adjustable bearing shaft having a bearing inner race support adapter member detachably mounted on one end thereof reciprocable through the circular opening of the said polepiece adapter means on which bearing inner race support adapter member the inner race member of a roller bearing to be tested is mountable of which the outer race member operates as a rotor in the rotating magnetic field of the stator; a manually rotatable knurled knob rotatably supported on said stand, said knurled knob and said shaft having mechanically interfitting portions constructed and arranged to transfer rotary motion of said knurled knob into reciprocable motion of said shaft for adjusting the said bearing shaft axially; and indicator means related to said coupled knurled knob and shaft for indicating the relative position of a bearing on the bearing inner race support adapter member with respect to the polepiece adapter means circular opening to determine the magnetic induction necessary to start the outer race member of the bearing to rotate.

5. An electric bearing tester for bearings having inner and outer race members with rolling elements therebetween comprising in combination; a base member, adapted to rest on an end or on at least one flattened side, supporting a stator for producing a rotating field with the axis thereof perpendicular to the said base member; polepiece adapter means, having a central circular opening, detachably mounted on polepiece ends of the said stator; a bearing shaft axially and nonrotatably movable along the axis of the said stator, having a bearing receiving adapter means detachably mounted on one end thereof, reciprocable through the polepiece adapter means opening on which bearing receiving adapter means the inner race member of a roller bearing to be tested is mountable of which the outer race member operates as a rotor in the rotating magnetic field of the stator; means for moving the said bearing shaft axially comprising a gear rack on the said bearing shaft and a cooperative manually operative pinion means rotatably journaled on the said base member with said pinion being in mesh with said gear rack; and indicator means on said manually operative pinion means and said stand for registering the relative position of the said bearing receiving adapter means with respect to the said opening in the polepiece adapter means whereby the degree to which the bearing being tested and subjected to the rotating field of said stator for initially starting the bearing to rotate is determined.

6. An electric bearing tester for bearings having inner and outer race members with rolling elements therebetween comprising in combination; a stand supporting a stator for producing a rotating field having polepieces with a polepiece adapter means detachably mounted thereon, said polepiece adapter means having a circular opening therein; a bearing shaft nonrotatively axially movably mounted on the said stand along the axis of the said stator and having an inner bearing race adapter means detachably mounted on one end thereof reciprocable through the polepiece adapter means circular opening on which inner bearing race adapter means the inner bearing race of a roller bearing is mountable of which the outer race member operates as a rotor in the rotating magnetic field of said stator; means for axially moving the said bearing shaft comprising threads on the said bearing shaft in cooperative relation with a knurled nut axially immovable and rotatively mounted on the said stand; and indicating means comprising a pointer on said bearing shaft and a scale on said stand to register the relative position of the inner bearing race adapter means with respect to the polepiece adapter means circular opening upon rotation of the said knurled nut to adjustably move the said bearing shaft.

WILLIAM E. MERRILL.

REFERENCES CITED

The following references are of record in the file of this patent:

UNITED STATES PATENTS

| Number | Name | Date |
|---|---|---|
| 260,574 | Irwin | July 4, 1882 |
| 891,018 | Vawter | June 16, 1908 |
| 1,976,598 | Boothby et al. | Oct. 9, 1934 |
| 2,398,156 | Puterbaugh et al. | Apr. 9, 1946 |